(12) United States Patent
Subramanian et al.

(10) Patent No.: US 12,673,590 B2
(45) Date of Patent: Jul. 7, 2026

(54) FITTING FOR A VEHICLE SEAT, AND VEHICLE SEAT

(71) Applicant: Adient US LLC, Plymouth, MI (US)

(72) Inventors: Karthikeyan Maharajapuram Subramanian, Leverkusen (DE); Eduard Mérés, Skalica (SK); Ralf Vomberg, Muelheim (DE); Grit Scholz, Remscheid (DE); Kirubaharan Reginold Albert, Burscheid (DE); Balaji Paramasivam, Leverkusen (DE)

(73) Assignee: Adient US LLC, Plymouth, MI (US)

( * ) Notice: Subject to any disclaimer, the term of this patent is extended or adjusted under 35 U.S.C. 154(b) by 127 days.

(21) Appl. No.: 18/788,238

(22) Filed: Jul. 30, 2024

(65) Prior Publication Data

US 2025/0042312 A1     Feb. 6, 2025

(30) Foreign Application Priority Data

Jul. 31, 2023     (DE) ...................... 10 2023 120 273.1
Jun. 4, 2024     (EP) ..................................... 24179889

(51) Int. Cl.
B60N 2/225          (2006.01)

(52) U.S. Cl.
CPC .................................. B60N 2/2252 (2013.01)

(58) Field of Classification Search
CPC .................................................. B60N 2/2252
USPC .......................................................... 297/367
See application file for complete search history.

(56) References Cited

U.S. PATENT DOCUMENTS

| | | | | |
|---|---|---|---|---|
| 7,753,450 B2 * | 7/2010 | Eppert | ................. | B60N 2/2254 |
| | | | | 297/361.1 |
| 8,360,525 B2 * | 1/2013 | Cha | .................... | B60N 2/02246 |
| | | | | 297/362 |
| 8,424,970 B2 * | 4/2013 | Ito | ........................ | B60N 2/2213 |
| | | | | 297/362 |
| 8,911,319 B2 * | 12/2014 | Chae | .................... | B60N 2/2254 |
| | | | | 475/162 |
| 8,985,887 B2 * | 3/2015 | Vogel | .................. | B60N 2/2258 |
| | | | | 403/97 |

FOREIGN PATENT DOCUMENTS

| | | |
|---|---|---|
| JP | S6423246 U | 2/1989 |
| JP | 2006055476 A | 3/2006 |
| WO | 2012110213 A2 | 8/2012 |

* cited by examiner

*Primary Examiner* — Sarah B McPartlin
(74) *Attorney, Agent, or Firm* — Marshall & Melhorn, LLC

(57)          ABSTRACT

A fitting for a vehicle seat, the fitting having a first fitting part, a second fitting part and an eccentric pivoting the first fitting part and the second fitting part eccentrically with respect to each other about an eccentricity. In the event of an overload acting on the fitting, in particular in the event of an overload torque acting about the axis of rotation, the first fitting part and the second fitting part can be supported radially against each other by at least one supporting ring segment arranged radially outside the eccentric. A motor vehicle seat may have the at least one fitting.

18 Claims, 9 Drawing Sheets

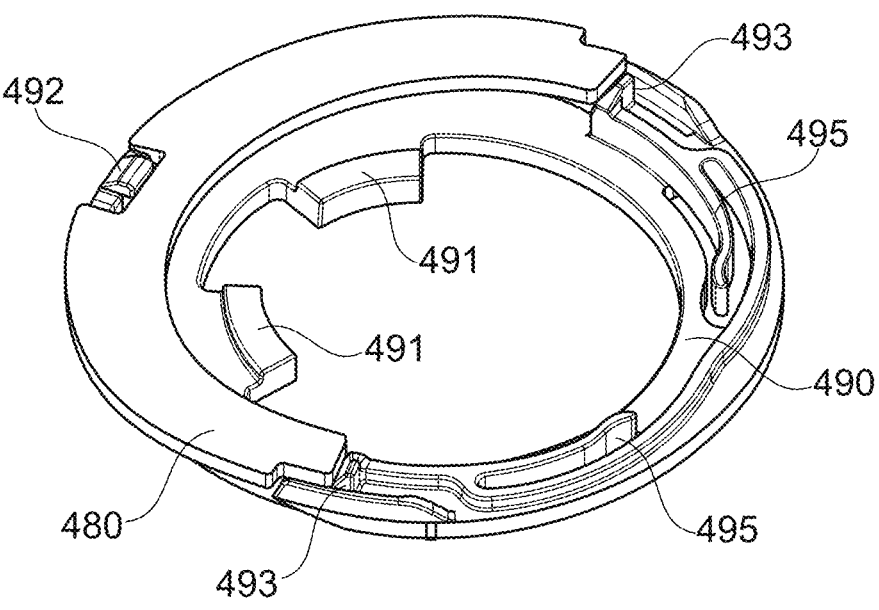
Fig. 10.1
Fig. 10.2

FITTING FOR A VEHICLE SEAT, AND VEHICLE SEAT

FIELD

The invention relates to a fitting for a vehicle seat, the fitting having a first fitting part, a second fitting part and an eccentric pivoting the first fitting part and the second fitting part on each other, the first fitting part having a toothed ring and the second fitting part having a gearwheel arranged eccentrically about an eccentricity with respect to the toothed ring, the toothed ring and the gearwheel being in meshing engagement with each other, where, in order to drive a relative rolling contact motion of gearwheel and toothed ring, the eccentric is rotatable about an axis of rotation.

BACKGROUND

WO 2012/110213 A1 discloses a fitting for a vehicle seat, the fitting having a first fitting part and a second fitting part which are rotatable relative to each other and which are in geared connection with each other by a toothed ring and a gearwheel meshing with the toothed ring, and an eccentric, which is driven by a driver and revolves in the circumferential direction, for driving a relative rolling contact motion of gearwheel and toothed ring.

The problem addressed by the invention is to improve a fitting of the type mentioned in the introduction, in particular to increase the strength of the fitting. In particular, the toothed ring and the gearwheel should not be able to be disengaged, not even be able to be partially disengaged, even under a high loading. The problem also addressed by the invention is to provide a particularly safe vehicle seat.

SUMMARY

This object is achieved according to the invention by a fitting for a vehicle seat, the fitting having a first fitting part, a second fitting part and an eccentric pivoting the first fitting part and the second fitting part eccentrically with respect to each other about an eccentricity, the first fitting part having a toothed ring and the second fitting part having a gearwheel, the toothed ring and the gearwheel being in meshing engagement with each other, where, in order to drive a relative rolling contact motion of gearwheel and toothed ring, the eccentric is rotatable about an axis of rotation, wherein at least one supporting ring segment which rotates together with the eccentric is arranged radially outside the eccentric, and in the event of an overload acting on the fitting, in particular in the event of an overload torque acting about the axis of rotation, the first fitting part and the second fitting part can be supported radially against each other by the at least one supporting ring segment.

By the fact that at least one supporting ring segment which rotates together with the eccentric is arranged radially outside the eccentric, and in the event of an overload acting on the fitting, in particular in the event of an overload torque acting about the axis of rotation, the first fitting part and the second fitting part can be supported radially against each other by the at least one supporting ring segment, the teeth of gearwheel and toothed ring remain in engagement up to a very high load range, which increases the strength of the fitting.

Advantageous refinements, which may be used individually or in combination with one another, are the subject matter of the dependent claims.

The eccentric can have two wedge segments and a driver segment. The eccentric can consist of two wedge segments and a driver segment. The eccentric can be arranged radially within an opening of one of the fitting parts. The eccentric can be arranged radially within an opening of the first fitting part. The eccentric can be arranged radially without play within the opening of the first fitting part. The eccentric can be arranged radially within an opening lined with a plain bearing bushing. The eccentric can be arranged radially without play within an opening lined with a plain bearing bushing.

The at least one supporting ring segment can be connected to the driver segment by a connecting element. The at least one supporting ring segment, the connecting element and the driver segment can be formed in one piece. The at least one supporting ring segment, the connecting element and the driver segment can be manufactured in one piece. The at least one supporting ring segment, the connecting element and the driver segment can be formed in multiple parts. The at least one supporting ring segment, the connecting element and the driver segment can be manufactured in multiple parts. The at least one supporting ring segment can be formed separately from the driver segment. The at least one supporting ring segment is not a functional component of the eccentric, since the supporting ring segment only generates a supporting effect when an overload acts on the fitting.

The at least one supporting ring segment can be arranged radially opposite the two wedge segments. Radially opposite means in particular that a center of gravity of the supporting ring segment (or a common center of gravity in the case of a plurality of supporting ring segments) is radially opposite a common center of gravity of the wedge segments. Radially opposite is intended to include a tolerance range of up to +/−45 degrees here.

The at least one supporting ring segment can have at least one first supporting surface for radially supporting at least one step of the first fitting part. The at least one step of the first fitting part can be formed circumferentially. The step of the first fitting part can be a drawn collar. The step can be annular. The step can be an axial step.

The at least one supporting ring segment can have at least one second supporting surface for radially supporting at least one step of the second fitting part. The at least one step of the second fitting part can be formed circumferentially. The at least one step of the second fitting part can be a drawn collar. The at least one step can be annular. The at least one step can be an axial step.

At least one spring can preload the at least one supporting ring segment, in particular radially, against the step of the second fitting part or against the step of the first fitting part.

The fitting can have two supporting ring segments. The two supporting ring segments can be preloaded onto each other in the circumferential direction by a force storage device, in particular a compression spring and/or a tension spring. The two supporting ring segments can be preloaded against a stop of the driver segment by the force storage device.

The at least one supporting ring segment can be connected to a driver segment of the eccentric by an annular connecting element. The at least one supporting ring segment can be fastened to the connecting element, in particular clipped to the connecting element. The connecting element can have a force storage arrangement, in particular at least one spring, for radially preloading the connecting element.

The problem is also solved by a vehicle seat according to the invention, having at least one fitting according to the invention. The vehicle seat can have a seat part and a backrest. The backrest can be hinged to the seat part by at least one fitting according to the invention. In other application options, the fitting can be used as a height adjuster, seat inclination adjuster, calf support inclination adjuster or shoulder support fitting.

In summary and in other words, a wobble fitting with improved strength is provided by the invention. The teeth of a gearwheel and of a toothed ring are not only held in the meshing engagement by an eccentric, but additionally also by at least one supporting ring segment. The at least one supporting ring segment thus provides a second support between the fitting parts. The at least one supporting ring segment preferably lies radially in relation to two wedge segments of the eccentric. The supporting ring segment can have play with respect to a step of a second fitting part at the outer diameter and/or play with respect to a step of a first fitting part at an inner diameter. After the initial deformation, the material of the supporting ring segment is used to continue to keep the teeth in engagement. The supporting ring segment can be connected in one piece to a driver ring for adjusting the fitting (adjustment of inclination of a backrest). Alternatively, the supporting ring segment can be connected in a form-fitting manner to a driver ring for adjusting the fitting (adjustment of inclination of a backrest) and can be driven by said driver ring. When using a two-part supporting ring segment, i.e. two supporting ring segments, these two supporting ring segments can be preloaded tangentially against the driver ring by at least one tension spring and/or at least one compression spring. At least one supporting ring segment can be fastened to a connecting element. The connecting element can be a carrier. The at least one supporting ring segment can be mounted on the connecting element. The at least one supporting ring segment can be clipped onto the connecting element or insert-molded with material of the connecting element. The connecting element can be connected in a form-fitting manner to the driver ring and can be driven by the latter. A spring function which causes preloading of the connecting element in the radial direction can be integrated in the connecting element. An inner diameter of the supporting ring segment can thereby be in contact with a step of a first fitting part having the toothed ring and an outer diameter of the supporting ring segment can have play with respect to a step of a second fitting part having the gearwheel. After the initial deformation of the teeth, the supporting ring segment is used for support so that the teeth continue to be kept in engagement.

DESCRIPTION OF THE FIGURES

The invention is explained in more detail below on the basis of advantageous exemplary embodiments illustrated in the figures. However, the invention is not restricted to these exemplary embodiments. In the figures.

DETAILED DESCRIPTION

Figure 1:
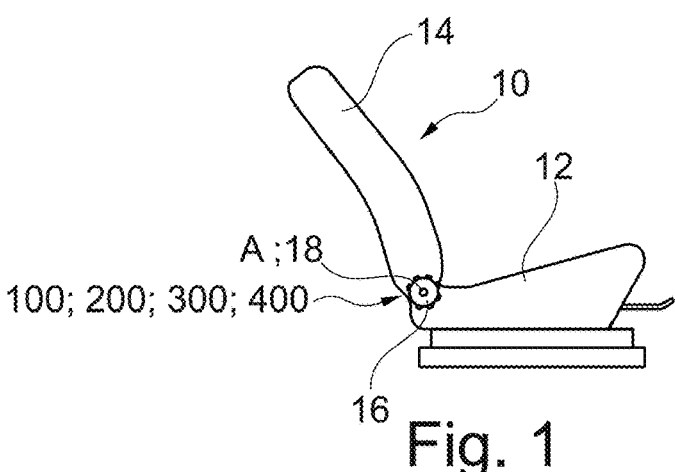
FIG. 1: shows a schematic side view of a vehicle seat according to the invention, having a fitting according to the invention.

FIG. 1 schematically shows a vehicle seat 10 according to the invention for a motor vehicle with a fitting 100; 200; 300; 400 according to the invention according to one of the exemplary embodiments described below.

The vehicle seat 10 has a seat part 12 and a backrest 14 which is adjustable in its inclination relative to the seat part 12. For the adjustment of the inclination of the backrest 14, a drive shaft 18 is rotated manually, for example by a handwheel 16, or by motor, for example by an electric motor, which drive shaft is arranged horizontally in a transition region between the seat part 12 and the backrest 14. On both sides of the vehicle seat 10, the drive shaft 18 engages in a respective fitting 100; 200; 300; 400 for conjoint rotation.

The drive shaft 18 defines an axis of rotation A. The positional information and directional information used below, such as radially, axially and in the circumferential direction, refer to this axis of rotation A of the drive shaft 18, unless otherwise described. Radially means perpendicular to the axis of rotation A. Axially means in the direction of or parallel to the axis of rotation A.

Figure 2:
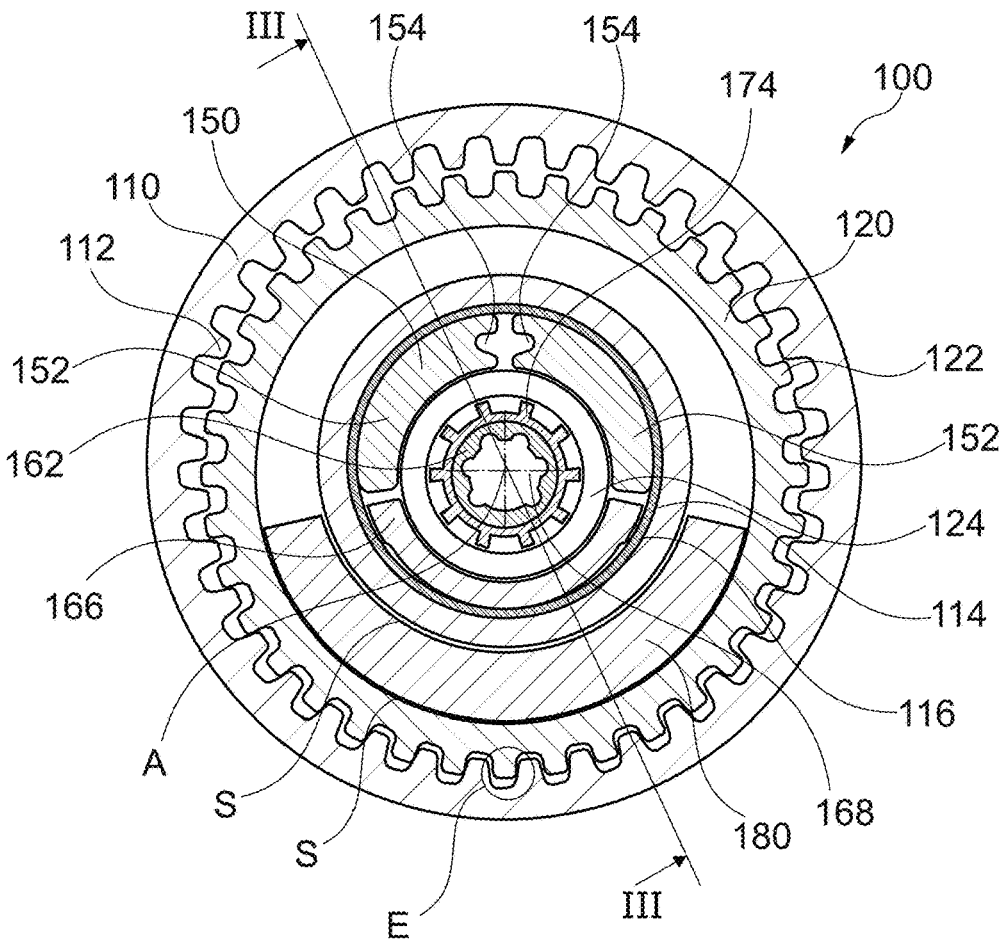
FIG. 2: shows a section through a fitting according to the invention according to a first exemplary embodiment along the line II-II in FIG. 3, FIG. 3: shows a section through the fitting from FIG. 2 along the line III-III in FIG. 2, FIG. 4: shows a section through a fitting according to the invention according to a second exemplary embodiment along the line IV-IV in FIG. 5.1, FIG. 5.1: shows a section through the fitting from FIG. 4 along the line V.1-V.1 in FIG. 4, FIG. 5.2: shows a section through the fitting from FIG. 4 along the line V.2-V.2 in FIG. 4, FIG. 6: shows a section through a fitting according to the invention according to a third exemplary embodiment along the line VI-VI in FIG. 7.1, FIG. 7.1: shows a section through the fitting from FIG. 6 along the line VII.1-VII.1 in FIG. 6, FIG. 7.2: shows a section through the fitting from FIG. 6 along the line VII.2-VII.2 in FIG. 6, FIG. 8: shows a section through a fitting according to the invention according to a fourth exemplary embodiment along the line VIII-VIII in FIG. 9, FIG. 9: shows a section through the fitting from FIG. 8 along the line IX-IX in FIG. 8, FIG. 10.1: shows a perspective view of a supporting ring segment during installation on a connecting element of the fitting from FIG. 8, and FIG. 10.2: shows a perspective view corresponding to FIG. 10.1 of the supporting ring segment after installation on the connecting element.
Figure 3:
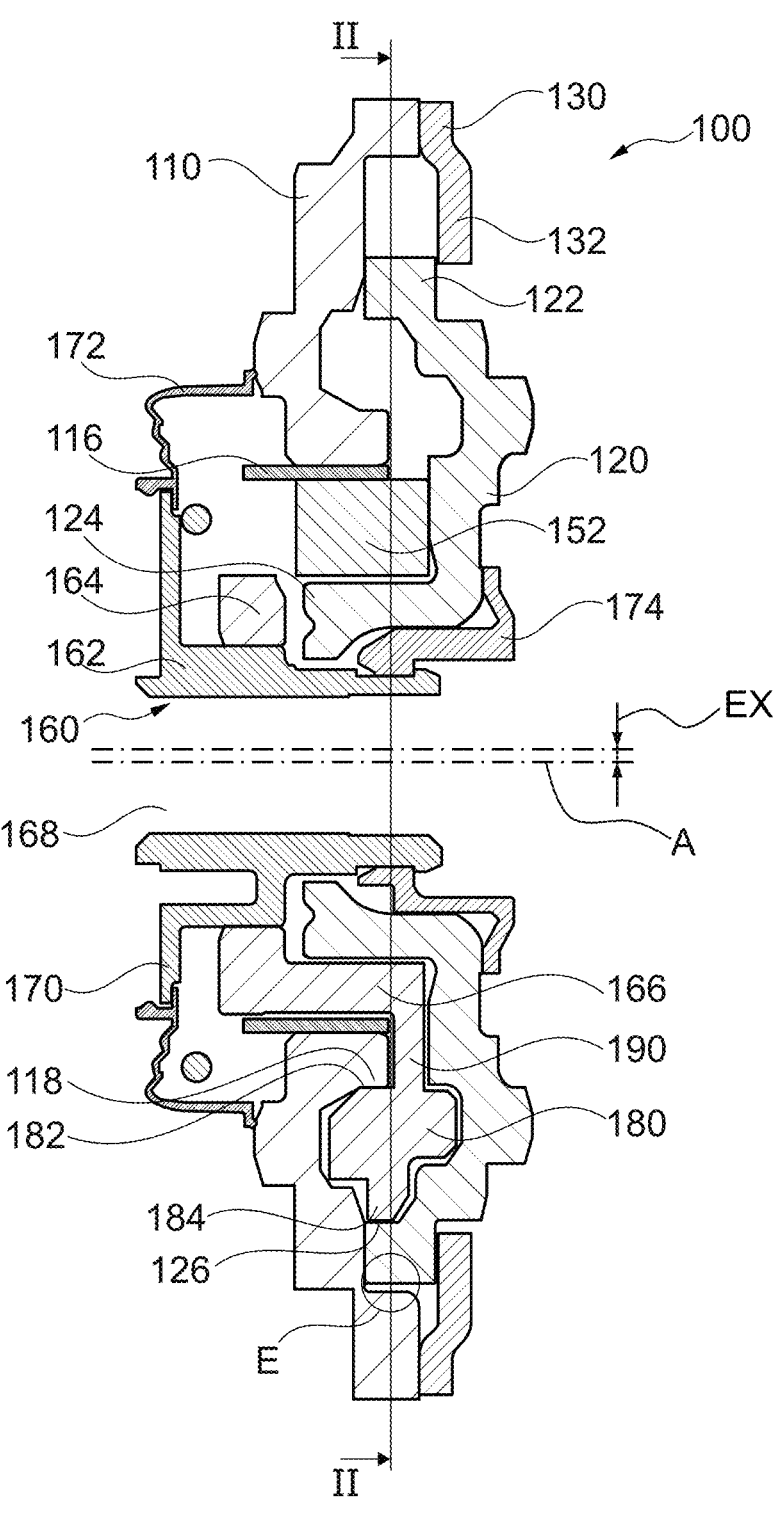

FIGS. 2 and 3 show a fitting 100 according to a first exemplary embodiment for a vehicle seat 10 according to the invention.

The fitting 100 has a first fitting part 110 and a second fitting part 120, which are rotatable relative to each other about the axis of rotation A in a manner described in more detail below, wherein a wobbling motion is superimposed on the rotational movement. The two fitting parts 110 and 120 can each approximately describe a circular disk shape. The two fitting parts 110 and 120 are preferably composed of metal, in particular steel, which may be hardened at least in regions. For absorbing the axially acting forces, that is to say for holding the fitting parts 110 and 120 together axially, a clasp ring 130 is provided. The clasp ring 130 is preferably composed of metal, in particular steel, which is preferably non-hardened. The clasp ring 130 preferably has a substantially flat ring shape.

The clasp ring 130 is fixedly connected to one of the two fitting parts 110, 120, in the present exemplary embodiment to the first fitting part 110. For this purpose, a radially outer edge portion of the clasp ring 130 is welded to a radially outer edge portion of the first fitting part 110. A radially inwardly facing, circumferential edge region 132 is used for the clasp ring 130 to engage over the other of the two fitting parts 110, 120 which are movable relative thereto, here the second fitting part 120, radially on the outside (i.e. its radially outer edge region) without interfering with the wobbling relative rotational movement of the two fitting parts 110 and 120 with respect to each other. The clasp ring 130 and the first fitting part 110 or second fitting part 120 fixedly connected thereto thus clasp the other of the two fitting parts 110, 120, which is movable relative to the clasp ring and the former fitting part. In structural terms, the two fitting parts 110 and 120 together with the clasp ring 130 form a disk-shaped unit.

In a modification of the first exemplary embodiment, an additional sliding ring may be arranged between the clasp ring 130 and the second fitting part 120.

During installation of the vehicle seat 10, the first fitting part 110 of the fitting 100 is fixedly connected to a structure of the backrest 14 and the second fitting part 120 of the fitting 100 is fixedly connected to a structure of the seat part 12. However, the assignments of the fitting parts 110 and 120 may also be swapped, i.e. the first fitting part 110 may alternatively be fixedly connected to the structure of the seat part 12 and the second fitting part 120 may be connected fixedly to the structure of the backrest 14. The fitting 100 lies in the force flux between the backrest 14 and the seat part 12.

The fitting 100 is designed as a geared fitting, in which the first fitting part 110 and the second fitting part 120 are connected to each other by a gear for adjusting and fixing, more precisely by an—in the present case self-locking—eccentric planetary gear, as described, for example, in DE 101 44 840 A1. The fitting 100 is therefore an articulated fitting.

To construct the gear, an internally toothed toothed ring 112 is formed on the first fitting part 110, and an externally toothed gearwheel 122 is formed on the second fitting part 120, the toothed ring and the gearwheel intermeshing. The diameter of the addendum circle of the external toothing of the gearwheel 122 is smaller by at least one times the tooth height than the diameter of the dedendum circle of the internal toothing of the toothed ring 112. An appropriate difference in the number of teeth of the gearwheel 122 and the toothed ring 112 of at least one tooth allows the toothed ring 112 to perform a rolling contact motion on the gearwheel 122. In the present case, the gearwheel 122 forms the radially outer edge of the second fitting part 120, i.e., radially on the outside, the second fitting part 120 ends with the gearwheel 122.

One of the two fitting parts 110, 120, in the present case the second fitting part 120, has a collar 124. The collar 124 is configured to be concentric to the gearwheel 122. The collar 124 can be formed as a drawn collar on the second fitting part 120 (that is, formed in one piece) or fastened thereto as a separate sleeve.

Two curved wedge segments 152 each have a curved inner surface and a curved outer surface. The two wedge segments 152 are supported with the curved inner surfaces on the collar 124. The wedge segments 152 use the curved outer surfaces for the pivoting of the other of the two fitting parts 110, 120, in the present case the first fitting part 110. For this purpose, a receiving opening of the last-mentioned fitting part (in the present case a receiving opening 114 of the first fitting part 110) is lined with a plain bearing bushing 116 which is preferably pressed into place for conjoint rotation and on which the outer surfaces of the two wedge segments 152 bear. The terms "support" and "mount" are not intended to be limited to a specific direction of the force flux through the fitting 100, since this direction depends in particular on the installation of the fitting 100 in the vehicle seat 10.

A respectively first end of each wedge segment 152 has a surface extending approximately in the radial direction, hereinafter referred to as wide side. An end of each wedge segment 152 lying opposite in the circumferential direction of the wide side has a surface also extending approximately in the radial direction, hereinafter referred to as narrow side. The wide side is larger in the radial direction than the narrow side.

The wedge segments 152, the wide sides of which face each other, by a respective opening 154 each receive an angled end finger of a preloaded and, for example, omega-shaped spring, not illustrated in the figures. This spring acts upon the wedge segments 152 in the circumferential direction in order to push them apart, with the wide sides of the wedge segments 152 being able to be in contact with each other and act upon each other during the adjustment of the fitting 100.

As previously described, the drive shaft 18 is rotatable about the axis of rotation A to adjust the angle of inclination of the backrest 14 about the axis of rotation A. A driver 160 is used to transmit the rotational movement of the drive shaft 18 to an eccentric 150 having the two wedge segments 152. The driver 160 has a driver hub 162 and a driver ring 164 connected to the driver hub 162 for conjoint rotation. In the present case, the driver 160 is formed in two parts by the driver hub 162 and the driver ring 164 being separately formed components which are connected to each other for conjoint rotation, in particular in a form-fitting manner by a plug-in toothing. The driver 160 is preferably composed of plastic.

The driver ring 164 has a driver segment 166, which (with play, as viewed in the circumferential direction) is arranged between the narrow sides of the wedge segments 152. The driver segment 166 is arranged directly adjacent in the circumferential direction (except for the play possibly located in between) to the narrow sides of the wedge segments 152 such that the driver segment 166 comes into direct contact with one of the two wedge segments 152 by rotation of the driver 160 and drives said wedge segment 152 directly. The driver segment 166 preferably has the shape of a hollow cylinder segment. The driver segment 166 is arranged radially between the collar 124 and the plain bearing bushing 116.

The eccentric 150 is formed by the two wedge segments 152 and the driver segment 166. The eccentric 150 in the present case has an interrupted, but approximately circular outer contour, which is offset by an eccentricity EX with respect to the axis of rotation A. Owing to the eccentricity EX, the eccentric 150 presses the teeth of the gearwheel 122 and of the toothed ring 112 maximally deeply into each other at an engagement point E. The depth of the tooth engagement decreases in the circumferential direction on both sides of the engagement point E. In a region radially opposite the engagement point E, the teeth of gearwheel 122 and toothed ring 112 are completely disengaged and are at the greatest possible distance from each other.

The driver hub 162 of the driver 160 is mounted rotatably in the collar 124 about the axis of rotation A. The driver hub 162 is provided centrally with a bore 168 for receiving the drive shaft 18. The profile of the bore 168 is designed to match the profile of the drive shaft 18, in the present case a splined shaft profile. The driver hub 162 also circumferentially has a cover disk 170. An outer diameter of the cover disk 170 is larger than an inner diameter of the collar 124. On the outside of the fitting part having the plain bearing bushing 116 (in the present case the first fitting part 110), a sealing ring 172, for example, made of rubber or soft plastic, is provided between its radially central region and the cover disk 170 and is connected, in particular clipped, to the cover disk 170.

The driver 160 is axially secured on the outside of the second fitting part 120 having the collar 124 by a preferably clipped-on circlip 174. The circlip 174 extends in the axial direction along a part of the driver hub 162 such that the driver hub 162 does not lie directly against the inside of the collar 124, but is mounted in the collar 124 with the interposition of the circlip 174 (and the driver 160 is thereby mounted on the second fitting part 120).

During driving by the drive shaft 18 which rotates (repeatedly) about the axis of rotation A, a torque is first of all transmitted in the manner described in more detail below to the driver 160 and then by the driver segment 166 to the wedge segments 152 of the eccentric 150. The eccentric 150 rotates relative to the two fitting parts 110, 120, as a result of which shifting of the direction of the eccentricity EX and thus a circumferential shifting of the engagement point E takes place, which results in a wobbling rolling contact motion of the teeth of the toothed ring 112 and gearwheel 122. The inclination of the backrest 14 is thereby infinitely variably adjustable between a plurality of use positions.

A maximum torque which can be transmitted by the fitting 100 depends on the quality of the meshing engagement between gearwheel 122 and toothed ring 112 in the region of the engagement point E and the adjacent regions on both sides, in which the teeth of gearwheel 122 and toothed ring 112 are at least partially still in meshing engagement. Under loading of the fitting 100, the wedge segments 152, by absorbing radial forces, prevent the distance between the plain bearing bushing 116 of the first fitting part 110 and the collar 124 of the second fitting part 120 from being reduced and thus the teeth of gearwheel 122 and toothed ring 112 from moving away from each other, in particular in the region of the engagement point E.

Due to its arrangement between the plain bearing bushing 116 and the collar 124, the driver segment 166 can only indirectly and to a limited extent reduce deformations of the fitting parts 110, 120, which take place radially outside the plain bearing bushing 116 and are detrimental to the meshing engagement between gearwheel 122 and toothed ring 112. Therefore, an additional supporting ring segment 180 is provided.

The supporting ring segment 180 additionally reduces elastic and plastic deformations of the first fitting part 110 and/or of the second fitting part 120, which, under high loads on the fitting 100, may occur in a region radially outside the plain bearing bushing 116 and adversely affect the meshing engagement of the teeth of toothed ring 112 and gearwheel 122. For this purpose, the supporting ring segment 180 has a first, in particular circular cylindrical, supporting surface 182 for radially supporting a circumferential, in particular circular cylindrical, step 118 of the first fitting part 110. The step 118 here is formed by a circumferential, radially outer surface of the collar 124. In addition, the supporting ring segment 180 has a second, in particular circular cylindrical, supporting surface 184 for radially supporting a circumferential, in particular circular cylindrical, step 126 of the second fitting part 120. The supporting ring segment 180 is a curved segment extending over an angle of less than 360 degrees, in particular less than 180 degrees. In the present case, the supporting ring segment 180 extends over the same obtuse angle as the driver segment 166.

In the event of an overload acting on the fitting 100, in particular in the event of an overload torque acting about the axis of rotation A, the supporting ring segment 180 provides radial support between the second fitting part 120 and the gearwheel 122 of the first fitting part 110 and thus, in addition to the radial support by the driver segment 166, provides radial support between the first fitting part 110 and the second fitting part 120. As a result, the meshing engagement between toothed ring 112 and gearwheel 122 is maintained for longer in the event of overload, resulting in a higher maximum torque which can be transmitted, i.e. in a higher strength of the fitting 100.

Between the first supporting surface 182 and the step 118 of the first fitting part 110 and/or between the second supporting surface 184 and the step 126 of the second fitting part 120, there is a respective play S in the radial direction during normal operation of the fitting 100. The play S arises because of elastic and/or plastic component deformation in the event of an overload acting on the fitting 100. The play enables the supporting ring segment 180 to rotate in a manner substantially free of friction while the fitting 100 is adjusted during normal operation. After the play S in the event of an overload occurring has been overcome, the supporting ring segment 180 can act in a supporting manner in the radial direction, as described above.

The supporting ring segment 180 is connected to the driver segment 166 for conjoint rotation by an, in particular substantially flat, connecting element 190. The connecting element 190 in the present case is in the form of an annular disk segment, that is, an open annular disk, which extends in the circumferential direction in particular over the same angular range as the supporting ring segment 180. The driver segment 166, the connecting element 190 and the supporting ring segment 180 in the present case are integrated in one piece in the driver ring 164. During the installation of the fitting 100, first of all the driver ring 164 and the wedge segments 152 (and thus the eccentric 150) are arranged between the two fitting parts 110, 120 and the fitting parts 110, 120 are axially fixed with respect to each other by the clasp ring 130. Only then is the driver hub 162 inserted into the driver ring 164 and axially secured by the circlip 174.

Figure 4:
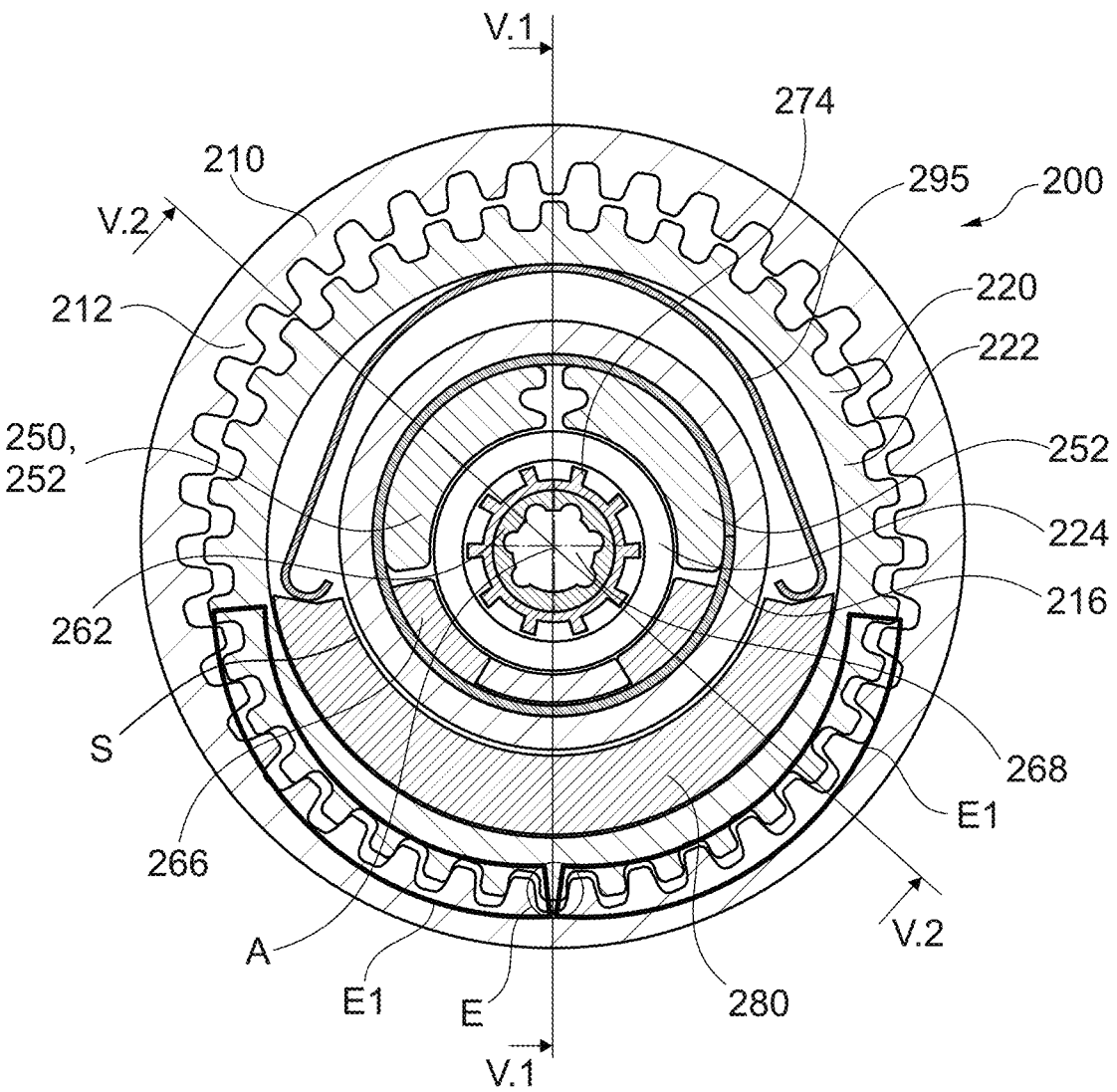
Figure 5:
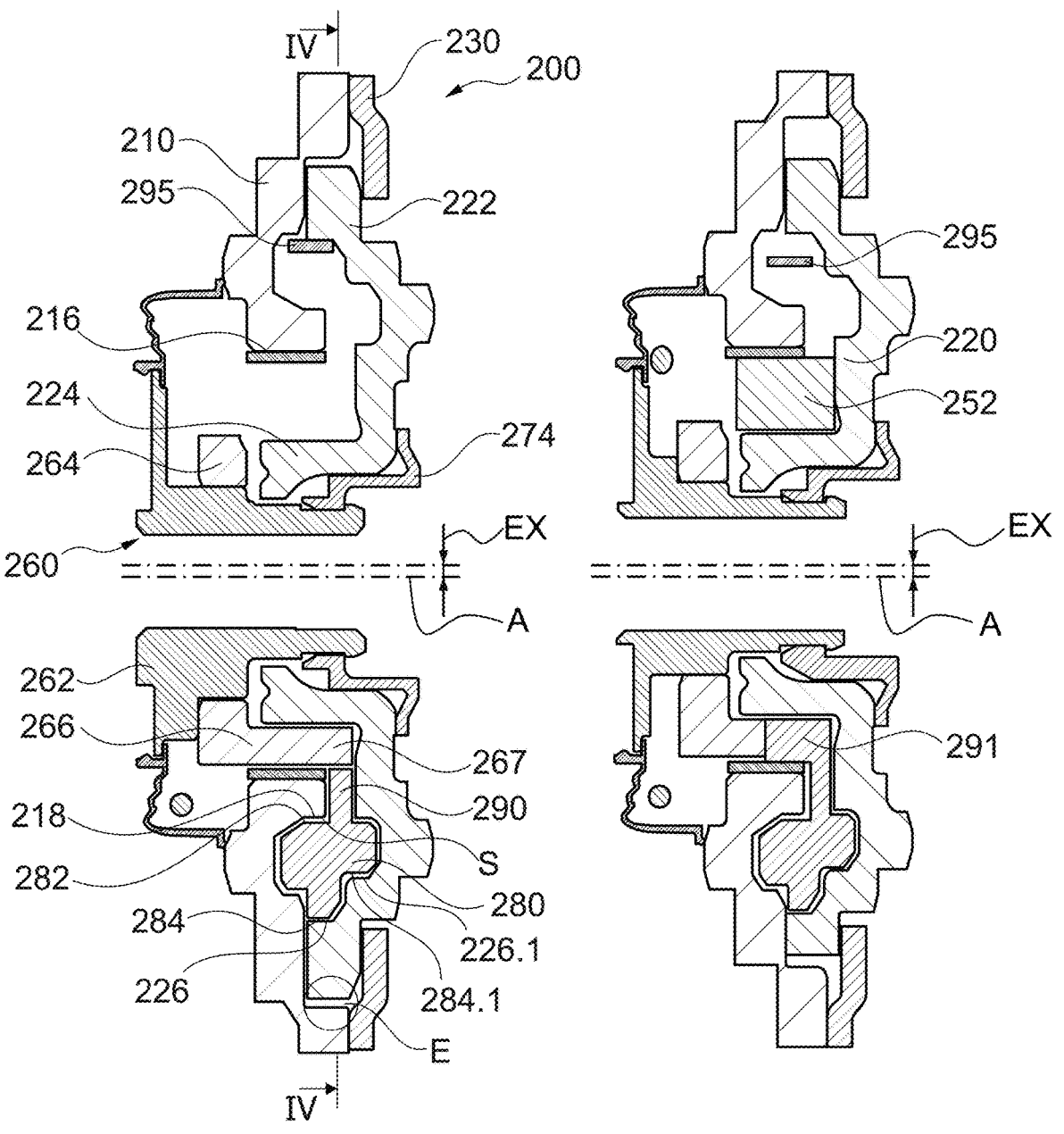

FIGS. 4, 5.1 and 5.2 show a fitting 200 according to a second exemplary embodiment for a vehicle seat 10 according to the invention. Unless otherwise described below, the fitting 200 corresponds in terms of structure and function to the previously described fitting 100. Identical or equivalent components bear reference signs higher by the value of 100.

An eccentric 250 is formed by two wedge segments 252 and a driver segment 266. The eccentric 250 in the present case has an interrupted, but approximately circular outer contour, which is offset by an eccentricity EX with respect to the axis of rotation A. The eccentric 250 presses a gearwheel 222 of a second fitting part 220 and a toothed ring 212 of a first fitting part 210 maximally deeply into each other at an engagement point E counter to the direction of the eccentricity EX. The depth of the tooth engagement decreases in the circumferential direction on both sides of the engagement point E. In FIG. 4, an extended engagement region E1 is respectively shown on the right and left of the engagement point E, within which the teeth of gearwheel 222 and toothed ring 212 are at least partially in meshing engagement and thus strength-increasing. In a region radially opposite the engagement point E, the teeth of gearwheel 222 and toothed ring 212 are completely disengaged.

The other exemplary embodiments of the fittings 100; 300 also have corresponding extended engagement regions, although these are not marked in the corresponding figures.

A supporting ring segment 280 additionally reduces elastic and plastic deformations of the first fitting part 210 and/or of the second fitting part 220, in particular in the region of the teeth of the toothed ring 212 and/or gearwheel 222, that would take place under high loads in a region radially outside a plain bearing bushing 216. For this purpose, the supporting ring segment 280 has a first supporting surface 282 for radially supporting a circumferential step 218 of the first fitting part 210. The step 218 here is formed by a circumferential, radially outer surface of the collar 224. In addition, the supporting ring segment 280 has two second supporting surfaces 284, 284.1 for radially supporting a respective step 226, 226.1 of the second fitting part 220.

The supporting ring segment 280 is a curved segment extending over an angle of less than 360 degrees, in particular less than 180 degrees.

In the event of an overload acting on the fitting 200, in particular in the event of an overload torque acting about the axis of rotation A, the supporting ring segment 280 (as previously described in the first exemplary embodiment), in addition to a driver segment 266, provides radial support between the first fitting part 210 and the second fitting part 220. As a result, the meshing engagement between toothed ring 212 and gearwheel 222 is maintained for longer in the event of overload, resulting in a higher maximum torque which can be transmitted, i.e. in a higher strength of the fitting 200.

Between the first supporting surface 282 and the step 218 of the first fitting part 210, a play S is present in the radial direction during normal operation of the fitting 200, which play arises because of elastic and/or plastic component deformation in the event of an overload acting on the fitting 200.

A force storage device, in the present case a spring 295, preloads the supporting ring segment 280 against the step 226 and/or the step 226.1, such that at least one of the two second supporting surfaces 284, 284.1 bears against the assigned step 226 and/or step 226.1 without play. This avoids formation of noise because of radial relative movements between the supporting ring segment 280 and the fitting parts 210, 220.

The spring 295 is approximately C-shaped. The two end regions of the spring 295 are both supported on the supporting ring segment 280, preferably in each case on an end face of one of the two end regions of the supporting ring segment 280. A central region of the spring 295 is supported on a circumferential step of the second fitting part 220, in the present case on the step 226, on which one of the two second supporting surfaces 284, 284.1 is also supported radially opposite.

After the play S has been eliminated when an overload occurs, the supporting ring segment 280 (as described previously in the first exemplary embodiment) acts in a supporting manner in the radial direction between the two fitting parts 210, 220.

The supporting ring segment 280 is connected for conjoint rotation to the separately formed driver segment 266 of the driver ring 264 by a connecting element 290. The connecting element 290 and the supporting ring segment 280 are formed in one piece in the present case. The supporting ring segment 280 is arranged radially outside the connecting element 290. The connecting element 290 in the present case is in the form of an annular disk segment, from which two fingers 291 protrude radially on the inside in the axial direction.

The two fingers 291 are spaced apart from each other in the circumferential direction and receive the driver segment 266 between them. The two fingers 291 form a toothing which is formed in the axial direction and into which the driver segment 266 acting as a mating toothing is inserted axially. The fingers 291 and the driver segment 266 intermesh in such a way that the connecting element 290 (and thus also the supporting ring segment 280) are connected to the driver segment 266 for conjoint rotation.

The driver segment 266 is arranged directly between the fingers 291 in the circumferential direction (except for play optionally located in between). Each of the two fingers 291 is arranged directly on a narrow side of one of the two wedge segments 252 in the circumferential direction (except for the play optionally located in between), and therefore the driver segment 266 comes into direct contact with one of the two fingers 291 by rotation of the driver 260 and this finger 291 comes into direct contact with one of the two wedge segments 252 and thereby drives this wedge segment 252.

The driver segment 266 and the two fingers 291 preferably each have the shape of a hollow cylinder segment. The driver segment 266 and the two fingers 291 are arranged radially between the collar 224 and the plain bearing bushing 216.

The separate configuration of, on the one hand, the connecting element 290/supporting ring segment 280 and, on the other hand, the driver segment 266 means that the eccentric 250 having the two wedge segments 252 and the driver segment 266 can be fitted during the installation of the fitting 200, after the fitting parts 210, 220 have already been fixed axially by the clasp ring 230 to form a preassembly having the supporting ring segment 280. Only then are the eccentric 250 and the driver hub 262 inserted axially into the preassembly and secured axially by the circlip 274.

The fitting 200 of the second exemplary embodiment differs from the previously described fitting 100 of the first exemplary embodiment in particular in that the supporting ring segment 280 is formed separately from the driver ring 264.

Figure 6:
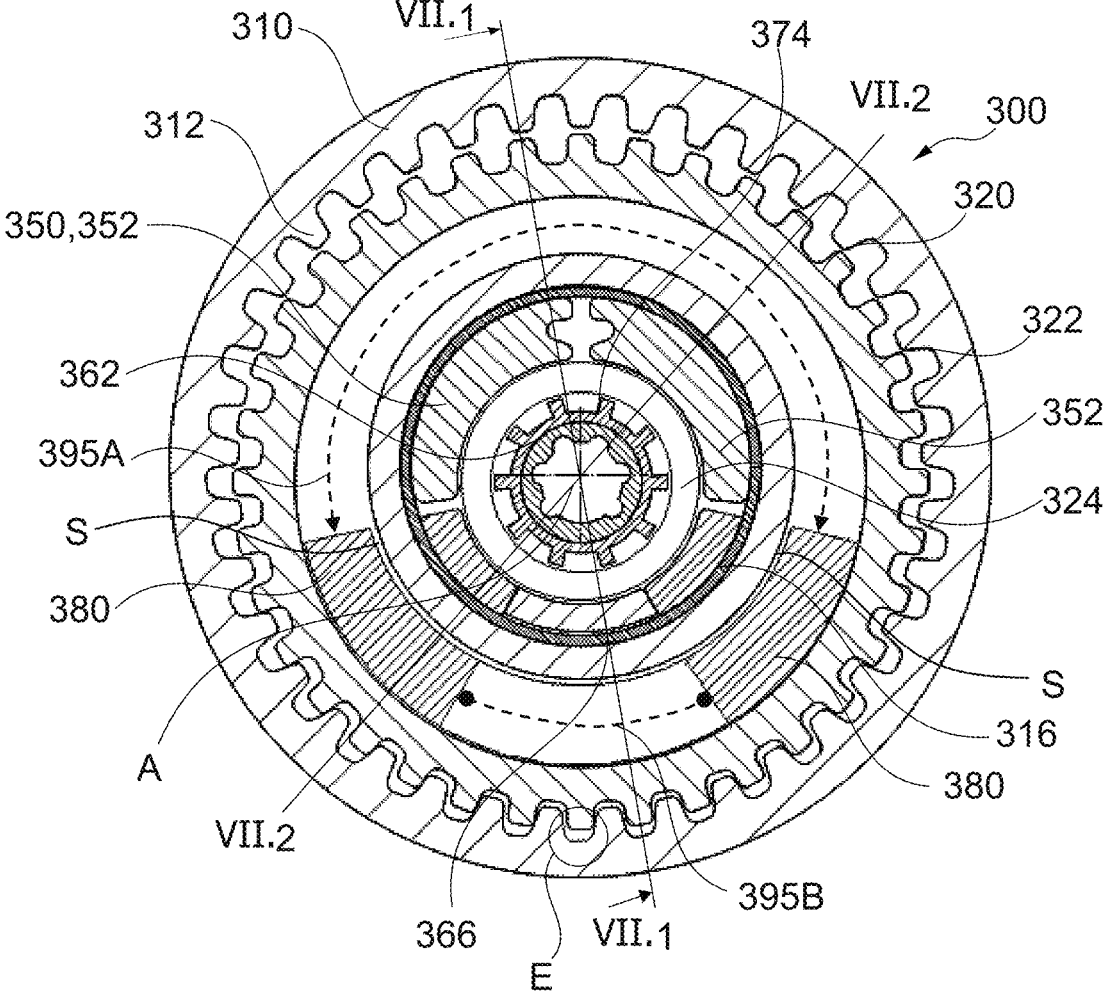
Figure 7:
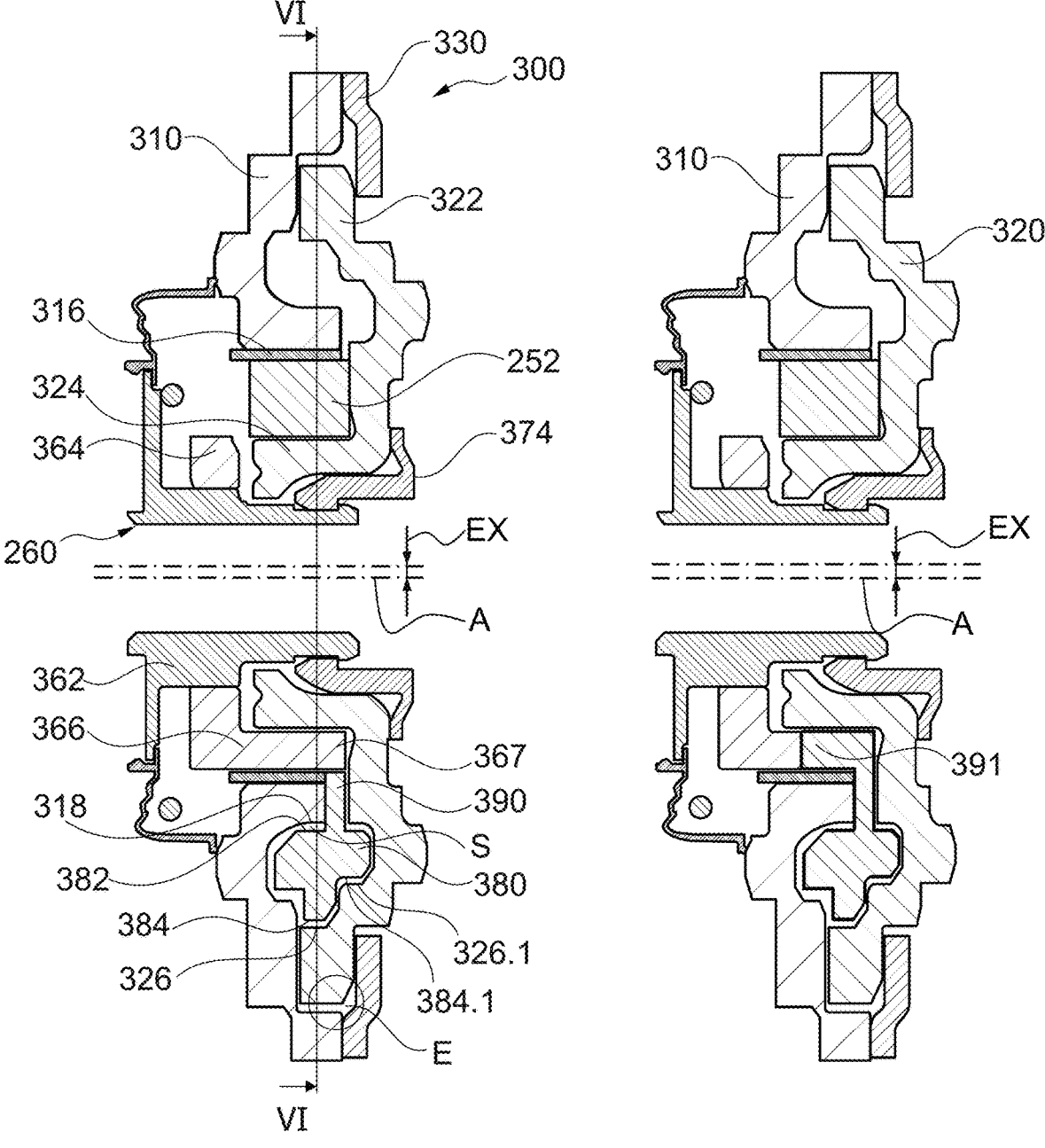

FIGS. 6, 7.1 and 7.2 show a fitting 300 according to a third exemplary embodiment for a vehicle seat 10 according to the invention. Unless otherwise described below, the fitting 300 corresponds in terms of structure and function to the previously described fitting 200. Identical or equivalent components bear reference signs higher by the value of 100 in comparison to the second exemplary embodiment.

In contrast to the fittings 100; 200 of the first two exemplary embodiments, each having precisely one supporting ring segment 180; 280, the fitting 300 of the third exemplary embodiment has two supporting ring segments 380. The two supporting ring segments 380 reduce elastic and plastic deformations of the first fitting part 310 and/or the second fitting part 320, in particular in the region of the teeth of the toothed ring 312 and gearwheel 322, that occur under high loads in a region radially outside a plain bearing bushing 316. For this purpose, the two supporting ring segments 380 each have a first supporting surface 382 for radially supporting a circumferential step 318 of the first fitting part 310. The step 318 here is formed by a circumferential, radially outer surface of the collar 324. In addition, the supporting ring segments 380 each have two second supporting surfaces 384, 384.1 for radially supporting a respective step 326, 326.1 of the second fitting part 320.

The two supporting ring segments 380 are curved segments, each extending over an angle of less than 180 degrees. In the present case, the supporting ring segments 380 extend each over an angle of less than 90 degrees.

In the event of an overload acting on the fitting 300, in particular in the event of an overload torque acting about the axis of rotation A, the two supporting ring segments 380, in addition to a driver segment 366, provide radial support between the first fitting part 310 and the second fitting part 320 and thus between the toothed ring 312 and the gearwheel 322. As a result, the meshing engagement between toothed ring 312 and gearwheel 322 is maintained for longer in the event of overload, resulting in a higher maximum torque which can be transmitted, i.e. in a higher strength of the fitting 300.

Between the respectively first supporting surface 382 and the step 318 of the first fitting part 310 and/or between the respectively second supporting surfaces 384, 384.1 and the steps 326, 326.1 of the second fitting part 320, a play S is in each case present in the radial direction during normal operation of the fitting 300, which play arises because of elastic and/or plastic component deformation in the event of an overload acting on the fitting 300. The play S enables the supporting ring segment 380 to rotate in a manner substantially free of friction while the fitting 300 is adjusted during normal operation. After the play S in the event of an overload occurring has been overcome, the supporting ring segment 380 can act in a supporting manner in the radial direction, as described above.

After the play S in the event of an overload occurring has been overcome, the two supporting ring segments 380 can act in a supporting manner in the radial direction in the same way as the exemplary embodiments described above.

Each of the two supporting ring segments 380 is formed in one piece with one of two connecting elements 390. The two connecting elements 390 of the supporting ring segments 380 are each preloaded against the driver segment 366 in the circumferential direction by at least one common force storage device, in the present case a (compression) spring 395A and/or a (tension) spring 395B. The force storage device clamps the two connecting elements 390 together in the circumferential direction and against the driver segment 366 such that a respective connecting element 390 lies against the driver segment 366 on both sides. This avoids formation of noise because of relative movements between the connecting elements 390 and the driver segment 366.

The separate configuration of, on the one hand, the connecting elements 390/supporting ring segments 380 and, on the other hand, the driver segment 366 means that the eccentric 350 having the two wedge segments 352 and the driver segment 366 can be fitted during the installation of the fitting 300, after the fitting parts 310, 320 have already been fixed axially by the clasp ring 330 to form a preassembly having the supporting ring segments 380. Only then are the eccentric 350 and the driver hub 362 inserted axially into the preassembly and secured axially by the circlip 374.

The fitting 300 of the third exemplary embodiment differs from the previously described fittings 100; 200, inter alia, in that two supporting ring segments 380 are provided.

Figure 8:
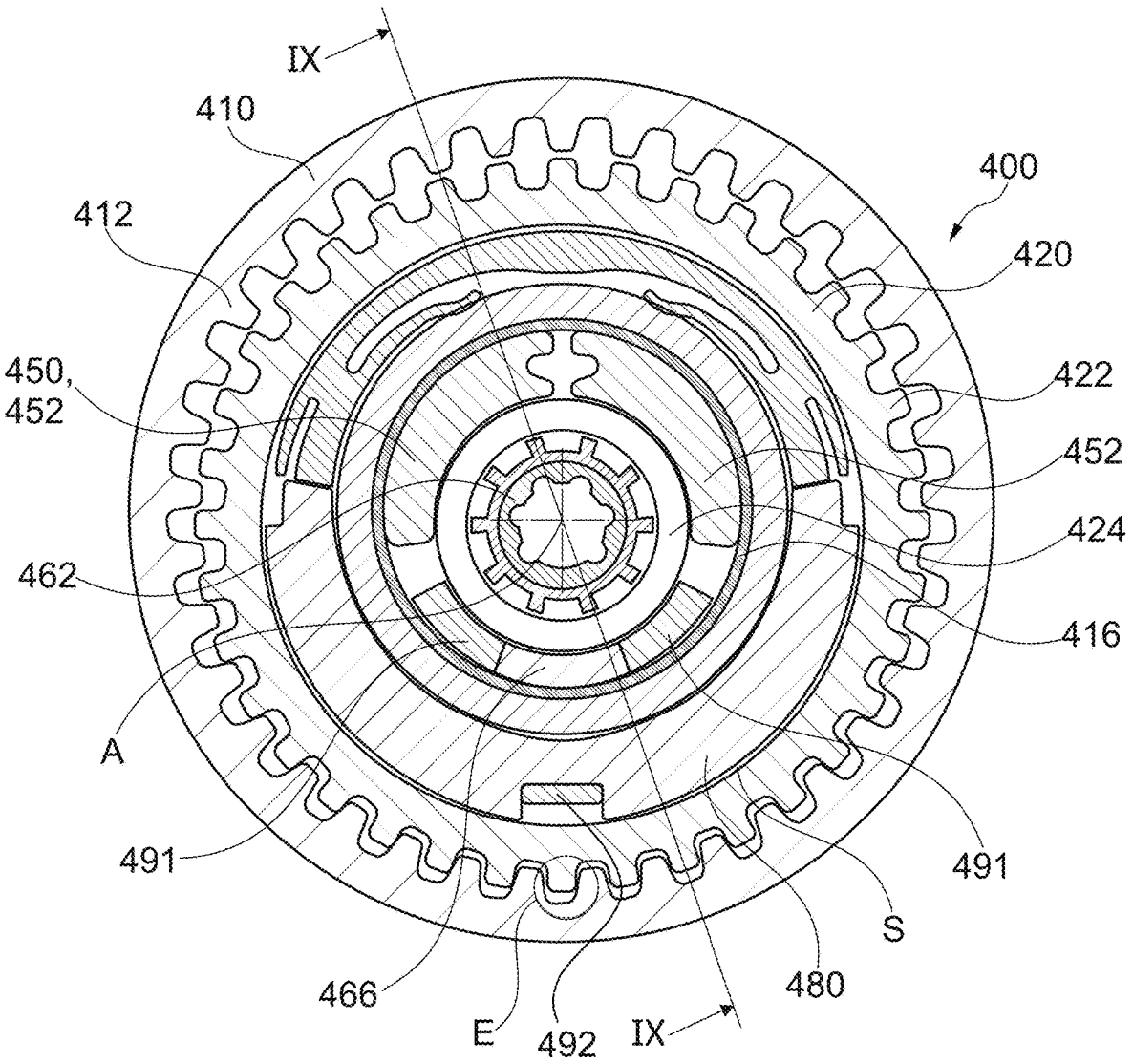
Figure 9:
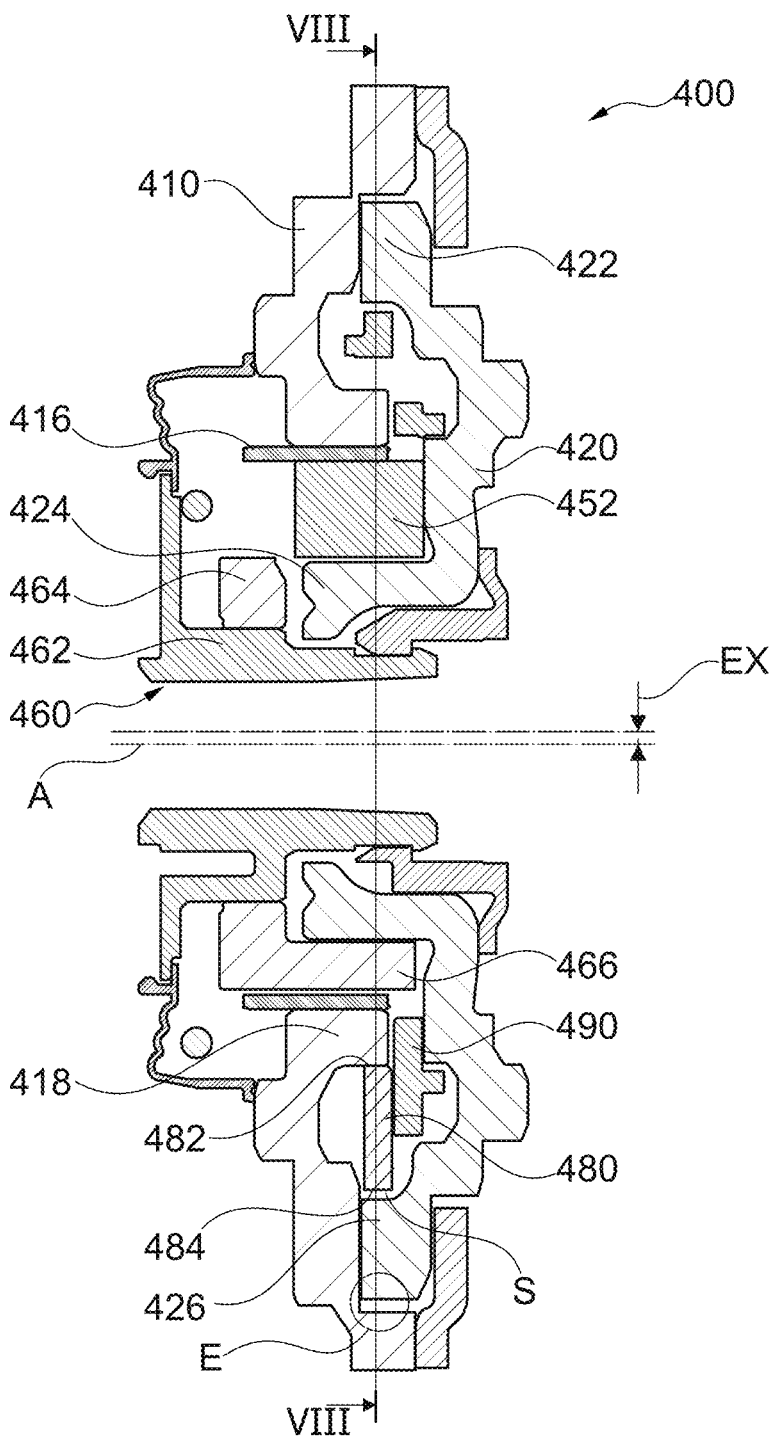

Precisely one supporting ring segment 480 also has a fitting 400 shown in FIGS. 8 to 10.2 according to a fourth exemplary embodiment. Unless otherwise described below, the fitting 400 corresponds in terms of structure and function to the fitting 200 of the second exemplary embodiment.

Identical or equivalent components bear reference signs higher by the value of 200 in comparison to the second exemplary embodiment.

An eccentric 450 is formed by two wedge segments 452 and a driver segment 466. The eccentric 450 in the present case has an interrupted, but approximately circular outer contour, which is offset by an eccentricity EX with respect to the axis of rotation A. The eccentric 450 presses a gearwheel 422 of a second fitting part 420 and a toothed ring 412 of a first fitting part 410 maximally deeply into each other at an engagement point E counter to the direction of the eccentricity EX.

A supporting ring segment 480 additionally reduces elastic and plastic deformations of the first fitting part 410 and/or of the second fitting part 420, in particular in the region of the teeth of the toothed ring 412 and/or gearwheel 422, that would take place under high loads in a region radially outside a plain bearing bushing 416. For this purpose, the supporting ring segment 480 has a first supporting surface 482 for radially supporting a circumferential step 418 of the first fitting part 410. In addition, the supporting ring segment 480 has a second supporting surface 484 for radially supporting a step 426 of the second fitting part 420.

The supporting ring segment 480 is a curved segment extending over an angle of less than 360 degrees, in particular greater than 180 degrees.

In the event of an overload acting on the fitting 400, in particular in the event of an overload torque acting about the axis of rotation A, the supporting ring segment 480 (as in the previously described exemplary embodiments), in addition to the eccentric 450, provides radial support between the first fitting part 410 and the second fitting part 420. As a result, the meshing engagement between toothed ring 412 and gearwheel 422 is maintained in the event of overload, resulting in a higher maximum torque which can be transmitted, i.e. in a higher strength of the fitting 400.

Between the second supporting surface 484 and the step 426 of the second fitting part 420, a play S is present in the radial direction during normal operation of the fitting 400, which play arises because of elastic and/or plastic component deformation in the event of an overload acting on the fitting 400. After the play S when an overload occurs is overcome, the supporting ring segment 480 acts in a supporting manner in the radial direction between the two fitting parts 410, 420.

The supporting ring segment 480 is connected for conjoint rotation to the driver segment 466 of the driver ring 464 by an annular connecting element 490. The connecting element 490 and the supporting ring segment 480 are separately formed components in the present case. The connecting element 490 can be manufactured from plastic. The supporting ring segment 480 can be manufactured from metal, in particular sintered metal, or plastic. The supporting ring segment 480 protrudes radially beyond the connecting element 490. The supporting ring segment 480 is fastened to the connecting element 490. The supporting ring segment 480 is sickle-shaped.

The supporting ring segment 480 and the connecting element 490 are connected to each other by a clip connection. As shown in FIGS. 10.1 and 10.2, the connecting element 490 has a hook 492 and two spring arms (clips) 493. During the installation of the supporting ring segment 480 on the connecting element 490, the supporting ring segment 480 is first pushed under the hook 492 (see FIG. 10.1) and then clipped with the spring arms 493 (see FIG. 10.2).

From the connecting element 490, two fingers 491 protrude radially inward in the axial direction. The two fingers

491 are spaced apart from each other in the circumferential direction and receive the driver segment 466 between them. The two fingers 491 form a toothing which is formed in the axial direction and into which the driver segment 466 acting as a mating toothing is inserted axially. The fingers 491 and the driver segment 466 intermesh in such a way that the connecting element 490 (and thus also the supporting ring segment 480) are connected to the driver segment 466 for conjoint rotation.

The driver segment 466 is arranged directly between the fingers 491 in the circumferential direction (except for play optionally located in between). Each of the two fingers 491 is arranged directly on a narrow side of one of the two wedge segments 452 in the circumferential direction (except for the play optionally located in between), and therefore the driver segment 466 comes into direct contact with one of the two fingers 491 by rotation of the driver 460 and this finger 491 comes into direct contact with one of the two wedge segments 452 and thereby drives this wedge segment 452.

The driver segment 466 and the two fingers 491 prefer- ably each have the shape of a hollow cylinder segment. The driver segment 466 and the two fingers 491 are arranged radially between the collar 424 and the plain bearing bush- ing 416.

The connecting element 490 also has a force storage arrangement, in the present case two springs 495. The two springs 495 are arranged radially opposite the supporting ring segment 480. The two springs 495 are connected in one piece to the connecting element 490, in particular configured as a plastics injection molded part. The two springs 495 are designed as spring arms which are supported on the first fitting part 410, in the present case on the step 418 of the first fitting part 410. The supporting ring segment 480 is pre- loaded by the two springs 495 against the step 418 of the first fitting part 410 such that the first supporting surface 482 bears without play against the assigned step 418. This avoids formation of noise because of radial relative movements between the supporting ring segment 480 and the fitting parts 410, 420.

The features which are disclosed in the above description, in the claims and in the figures can be of significance both individually and in combination for the implementation of the invention in its various embodiments, provided that they remain within the scope of protection of the claims.

LIST OF REFERENCE SIGNS

10 Vehicle seat
12 Seat part
14 Backrest
16 Handwheel
18 Drive shaft
100 Fitting
110 First fitting part
112 Toothed ring
114 Receiving opening
116 Plain bearing bushing
118 Step
120 Second fitting part
122 Toothed wheel
124 Collar, drawn collar
126 Step
130 Clasp ring
132 Edge region
150 Eccentric
152 Wedge segment
154 Opening

160 Driver
162 Driver hub
164 Driver ring
166 Driver segment
168 Bore
170 Cover disk
172 Sealing ring
174 Circlip
180 Supporting ring segment
182 First supporting surface
184, 184.1 Second supporting surface
190 Connecting element
200 Fitting
210 First fitting part
212 Toothed ring
216 Plain bearing bushing
218 Step
220 Second fitting part
222 Toothed wheel
224 Collar, drawn collar
226 Step
226.1 Step
230 Clasp ring
250 Eccentric
252 Wedge segment
260 Driver
262 Driver hub
264 Driver ring
266 Driver segment
267 Toothing
274 Circlip
280 Supporting ring segment
282 First supporting surface
284; 284.1 Second supporting surface
284.1 Second supporting surface
290 Connecting element
291 Finger
295 Spring
300 Fitting
310 First fitting part
312 Toothed ring
316 Plain bearing bushing
318 Step
320 Second fitting part
322 Toothed wheel
324 Collar, drawn collar
326 Step
326.1 Step
330 Clasp ring
350 Eccentric
352 Wedge segment
360 Driver
362 Driver hub
364 Driver ring
366 Driver segment
367 Stop
374 Circlip
380 Supporting ring segment
382 First supporting surface
384; 384.1 Second supporting surface
384.1 Second supporting surface
390 Connecting element
391 Finger
395A (Compression) spring
395B (Tension) spring
400 Fitting
410 First fitting part 412 Toothed ring
416 Plain bearing bushing
418 Step
420 Second fitting part
422 Toothed wheel
424 Collar, drawn collar
426 Step
450 Eccentric
452 Wedge segment
460 Driver
462 Driver hub
464 Driver ring
466 Driver segment
480 Supporting ring segment
482 First supporting surface
484 Second supporting surface
490 Connecting element
491 Finger
492 Hook
493 Spring arm, clip
495 Spring
A Axis of rotation
E Engagement point
E1 Extended engagement point
EX Eccentricity
S Play

What is claimed is:

1. A fitting for a vehicle seat, the fitting having a first fitting part, a second fitting part and an eccentric pivoting the first fitting part and the second fitting part eccentrically with respect to each other about an eccentricity, the first fitting part having a toothed ring and the second fitting part having a gearwheel, the toothed ring and the gearwheel being in meshing engagement with each other, where, in order to drive a relative rolling contact motion of gearwheel and toothed ring, the eccentric is rotatable about an axis of rotation, wherein at least one supporting ring segment which rotates together with the eccentric is arranged radially outside the eccentric, and in the event of an overload acting on the fitting, in particular in the event of an overload torque acting about the axis of rotation, the first fitting part and the second fitting part can be supported radially against each other by the at least one supporting ring segment, wherein the at least one supporting ring segment is connected to a driver segment of the eccentric by a connecting element, wherein the at least one supporting ring segment is fastened to the connecting element by being clipped to the connecting element.

2. The fitting as claimed in claim 1, wherein the eccentric has two wedge segments and the driver segment.

3. The fitting as claimed in claim 2, wherein the at least one supporting ring segment is connected to the driver segment by the connecting element.

4. The fitting as claimed in claim 2, wherein the at least one supporting ring segment is arranged radially opposite the two wedge segments.

5. The fitting as claimed in claim 2, wherein the at least one supporting ring segment has at least one first supporting surface for radially supporting at least one step of the first fitting part.

6. The fitting as claimed in claim 5, wherein the at least one step of the first fitting part is formed circumferentially.

7. The fitting as claimed in claim 5, wherein the at least one supporting ring segment has at least one second supporting surface for radially supporting at least one step of the second fitting part.

8. The fitting as claimed in claim 7, wherein the at least one step of the second fitting part is formed circumferentially.

9. The fitting as claimed in claim 8, wherein at least one spring preloads the at least one supporting ring segment against the step of the second fitting part or against the step of the first fitting part.

10. The fitting as claimed in claim 7, wherein the second supporting surface is in direct abutting contact with the at least one step of the second fitting part.

11. The fitting as claimed in claim 5, wherein the first supporting surface is in direct abutting contact with the at least one step of the first fitting part.

12. The fitting as claimed in claim 2, wherein the at least one supporting ring segment is formed separately from the driver segment.

13. The fitting as claimed in claim 1, wherein two supporting ring segments are provided which are preloaded onto each other in the circumferential direction by a force storage device comprised of a compression spring and/or a tension spring, wherein the force storage device is preloaded against a stop of the driver segment.

14. The fitting as claimed in claim 1, wherein the connecting element has a force storage arrangement comprising at least one spring for radially preloading the connecting element.

15. A vehicle seat for a motor vehicle having at least one fitting as claimed in claim 1.

16. The fitting as claimed in claim 1, wherein the supporting ring segment extends over an angle of less than 360 degrees.

17. The fitting as claimed in claim 1, wherein the supporting ring segment extends over an angle of less than 180 degrees.

18. The fitting as claimed in claim 1, wherein the supporting ring segment extends over a same angle as the driver segment.

\* \* \* \* \*